(12) United States Patent
Iao

(10) Patent No.: US 7,991,546 B2
(45) Date of Patent: Aug. 2, 2011

(54) DISPLAY METHOD AND APPARATUS FOR NAVIGATION SYSTEM FOR EFFICIENTLY SEARCHING CITIES ON MAP IMAGE

(75) Inventor: Mike Iao, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 903 days.

(21) Appl. No.: 12/001,093

(22) Filed: Dec. 10, 2007

(65) Prior Publication Data

US 2009/0150069 A1 Jun. 11, 2009

(51) Int. Cl.
*G01C 21/00* (2006.01)
(52) U.S. Cl. ........... 701/201; 701/209; 340/995.24; 340/995.27; 340/995.28
(58) Field of Classification Search ............... None
See application file for complete search history.

(56) References Cited

U.S. PATENT DOCUMENTS

| | | | |
|---|---|---|---|
| 6,088,649 A | 7/2000 | Kadaba et al. | |
| 7,490,004 B2 * | 2/2009 | Kimura | 701/201 |
| 7,788,600 B2 * | 8/2010 | Lau et al. | 715/810 |
| 2006/0224312 A1 * | 10/2006 | Imanishi | 701/209 |
| 2006/0253247 A1 * | 11/2006 | de Silva et al. | 701/201 |
| 2007/0124066 A1 * | 5/2007 | Kikuchi et al. | 701/209 |

FOREIGN PATENT DOCUMENTS

JP 07-103774 4/1995

* cited by examiner

*Primary Examiner* — Janice A. Mooneyham
*Assistant Examiner* — Thuy-Vi Nguyen
(74) *Attorney, Agent, or Firm* — Muramatsu & Associates

(57) ABSTRACT

A display method and apparatus for a navigation system promotes to quickly search a desired on a map image with respect to an order of distance from a current vehicle position or other reference position. On the screen of the navigation system, it displays a specially designed screen to implement the city search operation which includes a state selection box and a city selection box. The navigation system detects the search direction specified by the user and moves the cursor to the location of the candidate city in response to every operation of the input device in the order of distance in the specified direction. Thus, the user is able to find the city by its relative location to the current vehicle position or other reference location, thereby enabling to quickly and intuitively search the target city.

20 Claims, 19 Drawing Sheets

DISPLAY METHOD AND APPARATUS FOR NAVIGATION SYSTEM FOR EFFICIENTLY SEARCHING CITIES ON MAP IMAGE

FIELD OF THE INVENTION

This invention relates generally to a display method and apparatus, and more particularly, to a display method and apparatus for a navigation system for quickly searching a particular city or cities on a map image with respect to an order of distance from a current vehicle position or other reference position.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user.

When a destination is specified by a user, the navigation system determines a route to the destination based on, for example, the shortest way to reach the destination, the route using many free ways as possible or the route without using toll road, and the like. After determining the calculated route, the navigation system starts the route guidance operation to guide the user along the calculated route to the destination. Typically, the navigation system shows the intersection to show the next turn and a direction of the turn where such a turn is necessary at the intersection. Such route guidance by the navigation system is also accompanied by voice instructions.

The navigation system displays a map image on a monitor screen on which various map elements such as streets including the calculated route to the destination, fields, rivers, mountains, buildings, etc., as well as various icons are illustrated. The user is able to scroll the illustrated image on the screen to change the map image to that of the desired location. The map image is used not only to see the map of the area that surrounds the current user (current vehicle) position but also to find a specific location or an address of a particular place such as a favorite restaurant, gas station, etc. and to pin-point such a desired location on the screen of the navigation system.

When searching a particular location on the map image, there are many cases that the user wants to search a particular city first to narrow down the particular location within the city. This is because an address of a particular location, such as a destination that the user wants to visit, is typically defined by a street name, a house number, and a city name, and the navigation system needs such address information to determine a route to the destination. However, when the user wants to find a particular city on the map image, the user may often have a difficulty in specifying a desired city for the navigation system. Especially, it is difficult to find a city when the user is not familiar with the area where he/she wants to find the city because the user is from the other state, etc.

In many cases, the user would have to type-in the name of a city through a keyboard, however, the user may not know the exact spelling of the city name. Further, to maintain the safe driving, the user has to stop the vehicle for typing the city name, which is inconvenient when the user is driving the vehicle. Thus, a method of typing the particular city name for the navigation system is error-prone, inconvenient and dangerous.

If the user knows the abstract location of the desired city, the user may be able to find the city by browsing or scrolling the map image by operating a scrolling key, etc. However, scrolling the map image on the screen while driving a vehicle may be prohibited because it adversely affects the safe driving. Accordingly, there is a need of a new display method and apparatus which is conveniently designed for searching a city or cities on the map image of the screen of the navigation system.

SUMMARY OF THE INVENTION

It is, therefore, an object of the present invention to provide a display method and apparatus for a navigation system which is capable of quickly searching a city on the map image on the screen of the navigation system.

It is another object of the present invention to provide a display method and apparatus for a navigation system which is capable of quickly searching a city on the map image by moving a cursor to a candidate city every time when an input device is activated.

It is a further object of the present invention to provide a display method and apparatus for a navigation system which is capable of quickly searching a city on the map image through a specially designed display screen which includes a state selection box and a city selection box.

One aspect of the present invention is a display method for a navigation system for quickly searching a desired city on the map image. The method includes the steps of: displaying a map image on a screen of the navigation system; specifying a state name for searching a city within the specified state; specifying at least a first character of a desired city name within the specified state; determining a reference location which is either a current user position or a location of a first city derived from input by the user; detecting a search direction on the map image specified by the user through an input device; and moving a cursor on the map image to a location of a candidate city in the specified search direction in an order of distance from the reference location in response to each operation of the input device.

In the display method of the present invention, the step of specifying a state name includes a step of displaying a state selection box on a screen of the navigation system and a step of selecting a state name in the state selection box by the user. Further, the step of selecting a state name in the state selection box by the user includes a step of operating a first set of keys for selecting a first letter of candidate state names, and a step of operating a second set of keys for selecting the candidate state names that commonly have the selected first letter.

In the display method of the present invention, the step of specifying a city name includes a step of displaying a city selection box on a screen of the navigation system and a step of selecting a city name in the city selection box by the user. Further, the step of selecting a city name in the city selection box by the user includes a step of operating a first set of keys for selecting a first letter of candidate city names, and a step of operating a second set of keys for selecting the candidate city names that commonly have the selected first letter.

Further, in the display method of the present invention, the step of specifying a city name includes a step of displaying a city selection box on a screen of the navigation system and a step of selecting "any" in the city selection box by the user, thereby searching any city within the selected state.

In the display method of the present invention, the step of specifying a state name includes a step of displaying a state selection box on a screen of the navigation system, a step of examining a current position of the user, and a step of automatically determining the state where the current user position exists as the specified state in the state selection box unless other state is specifically selected by the user.

In the display method of the present invention, the step of determining a reference location includes a step of selecting the current user position as the reference location when the current user position exists within the selected state, and a step of selecting the location of the city selected by the user as the reference location when the current user position is outside of the selected state. Further, the display method includes a step of selecting the location of the first city selected by the user as the reference location when the current user position is too far away from a search area that includes the first city selected by the user even when the current user position exists within the selected state.

In the display method of the present invention, the step of moving a cursor to a location of a candidate city includes a step of moving the cursor to a next candidate city every time when a direction key of the input device is activated.

Another aspect of the present invention is a display apparatus for efficiently searching a city on the map image of the navigation system for implementing the steps defined in the methods of the present invention noted above. The apparatus includes various means to examine the map data concerning the location of the cities with reference to the current vehicle position or any position specified by the cursor point. The apparatus is able to dramatically decrease the time required to find a city on the map image, thus, able to dramatically reduce the time to find a desired location within the selected city.

According to the present invention, the display method and apparatus efficiently and intuitively displays the locations of the city surrounding the current vehicle position or any position specified by the user. On the screen of the navigation system, the present invention displays a specially designed screen to implement the city search operation. The display screen includes a state selection box and a city selection box, which are used to find a desired city under the present invention. The navigation system detects the direction specified by the user and moves the cursor to the location of the candidate city in response to every operation of the input device in the order of distance in the specified direction. Thus, the user is able to find the city by its relative location to the current vehicle position or other reference location, thereby enabling to quickly and intuitively search the target city.

DETAILED DESCRIPTION OF THE PREFERRED EMBODIMENT

Figure 1:
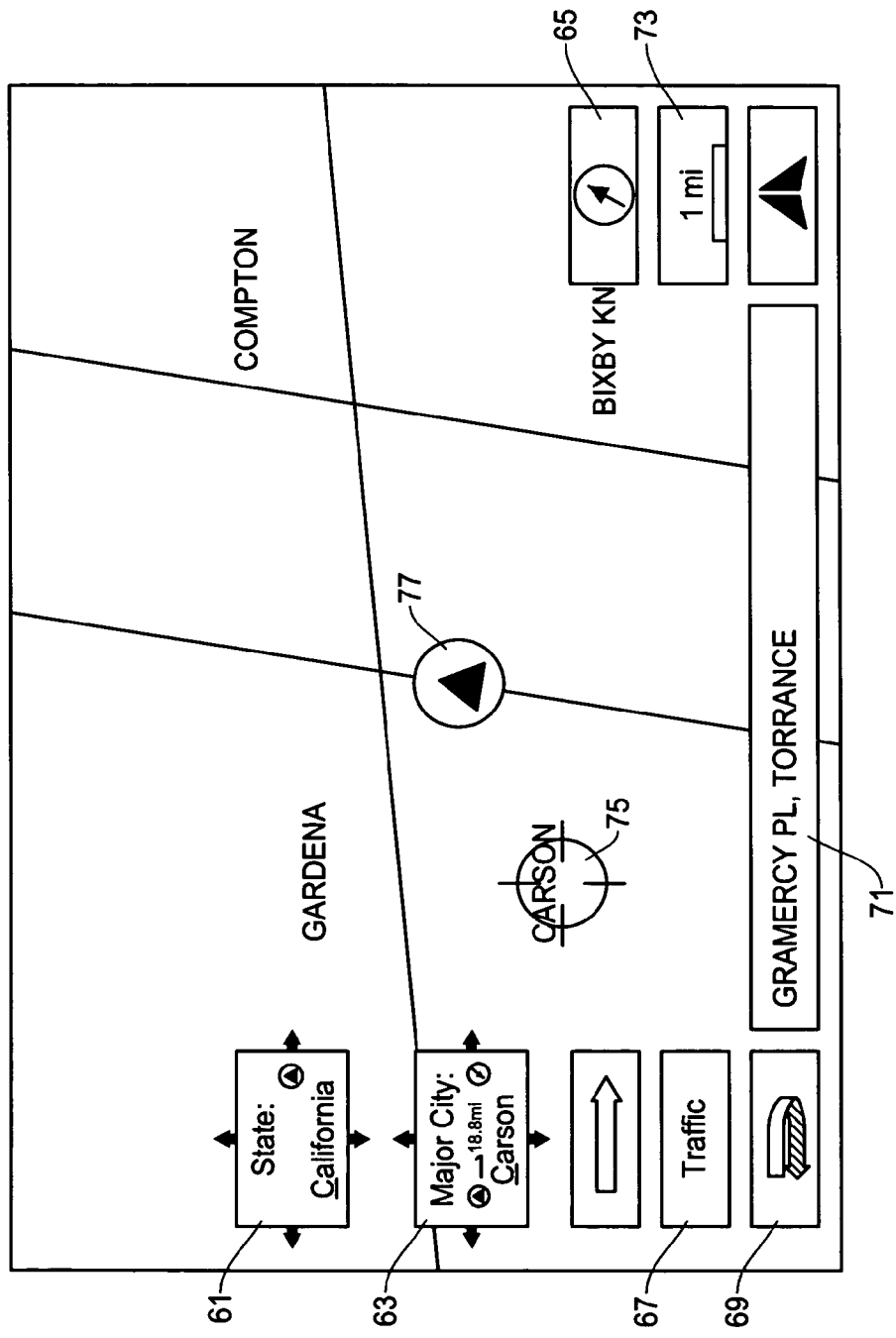
FIG. 1 is a schematic diagram showing an example of basic display method for searching a city on the map image under the present invention.

The display method and apparatus for searching a city through a map image on the screen of the navigation system under the present invention is explained with reference to the accompanying drawings. In the following, the description will be made mainly for the case where the display method and apparatus is applied to a vehicle navigation system. However, the display method and apparatus for efficiently searching a desired city under the present invention can be implemented to other devices having a navigation function to determine a calculated route to the destination, such as portable navigation devices, PDAs, cellular phones, wrist watches, personal computers, etc.

The display method and apparatus of the present invention provides an efficient and intuitive way of searching a desired city on the map image on the navigation screen. As noted above, when the user attempts to find a city on the map image to select a destination to visit, etc., there arises a problem that a particular city may not be easily found when the user is not familiar with the area that covering the particular city. The problems described above become further serious when the user attempts to type-in the city name a through keyboard or to scroll the map image because such activities adversely affect the safe driving as well as easily involve errors.

The display method and apparatus of the present invention enables to efficiently and intuitively display the locations of the city surrounding the current vehicle (user) position or any position specified by the user. On the screen of the navigation system, the present invention displays a specially designed screen shown in FIG. 1 to implement the city search operation. As shown, the display screen includes a state selection box 61 and a city selection box 63, which are used to find a desired city under the present invention.

Namely, the state selection box 61 and the city selection box 63 are used to specify a state name and a city name, respectively, to specify the search area and other information. The screen display of FIG. 1 also includes a traffic button 67 that is used to retrieve and display traffic information, a return button 69 that is used to return to a previous screen, a location indicator 71 that is used to describe the current road that the user is running by its street name and city name.

The display screen of FIG. 1 further includes a direction indicator 65 such as a North pointer that shows the direction of the map image, and a scale indicator 73 to indicate a map scale. A vehicle indicator 77 is shown on the map image to indicate the current position of the vehicle or user. The example of FIG. 1 further includes a cursor 75 which is freely movable on the screen by operating an input device such as a joystick, a remote controller, etc.

Figure 4A:
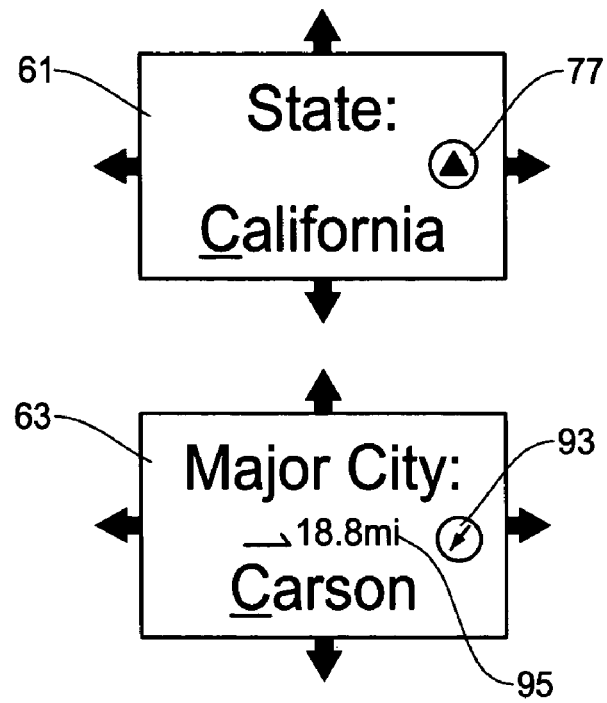
FIGS. 4A and 4B are schematic diagrams showing enlarged views of a state selection box and a city selection box incorporated in the display method and apparatus of the present invention.
Figure 4B:
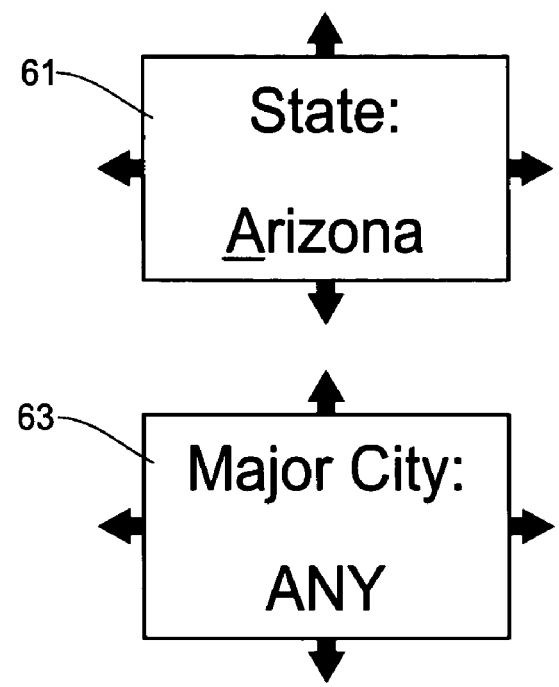

With respect to the state selection box 61 in FIG. 1, the navigation system indicates the default state as the state where the vehicle is currently located. In this example, the state selection box indicates "California" since the vehicle is currently located in the state of California. Enlarged views of the set of state selection box 61 and city selection box 63 are illustrated in FIGS. 4A and 4B, respectively, as will be explained later.

The user is able to change the state name by means of a keyboard, a touch screen button, or any other input device. In this example, by pressing either an up or down key (first set of keys), the state name in the state selection box 61 will change based on the first alphabetical character of the state name. Further, by pressing either a right or left key (second set of keys), the state name in the state selection box 61 will change among the states having the same first alphabetical character of the state name. It should be noted that the allocation of the roles of the up and down keys (first set of keys) and the right and left keys (second set of keys) noted above are mutually exchangeable.

When the state selection box 61 shows the state of California that has the initial letter "C", as the down button is pressed, the state name that starts with a character "D" like Delaware will be shown. Likewise, if the up button is pressed, the state name that starts with the alphabet "A" such as Alabama will be shown. The state name that starts with alphabet "B" has been skipped from the state selection box 61 since there is no state name in the United States that starts with the letter "B".

When the first letter of a desired state name is selected, as noted above, the user may retrieve a desired state name by pressing either left or right directions of keypad or joystick. Thus, in the case where the selected initial letter of state name is "C", by pressing either left or right, the state selection box 61 will show California, Colorado, and Connecticut. In many cases, the user wants to find a city within the state that the user is currently located which is automatically set as a default state, thus, in such a case, the user may skip the step described above for selecting the state and proceed directly to the city selection box 63 to select a desired city.

Assuming that the state of California has been selected, the user selects the city selection box 63 to select a desired city name or at least a first character of the desired city name. Similar to the process described above regarding the state selection box 61, the city selection box 63 works by using an up or down key (first set of keys) to find a desired first letter of a city name. Further, the city selection box 63 works by using a right or left key (first set of keys) to find a desired city name having the same first letter.

As a consequence, in the display example of FIGS. 1 and 4A, the state name "California" is shown in the state selection box 61 where the first character "C" is highlighted (underlined). Further, in the display example shown in FIGS. 1 and 4A, the city name "Carson" is shown in the city selection box 63 where the first character "C" is highlighted (underlined). It should be noted that the allocation of the roles of the up and down keys (first set of keys) and the right and left keys (second set of keys) noted above are mutually exchangeable.

In the example shown in FIG. 4A, the state selection box 61 has a vehicle mark 77 that indicates that the vehicle is currently located within the state indicated by the state selection box 61. Moreover, a city direction mark 93 is shown in the city selection box 63 that shows an approximate direction to the city of Carson from the current position. Further, in the city selection box 63, an approximate distance to the city of Carson from the current vehicle position is indicated by a distance indicator 95.

Figure 2A:
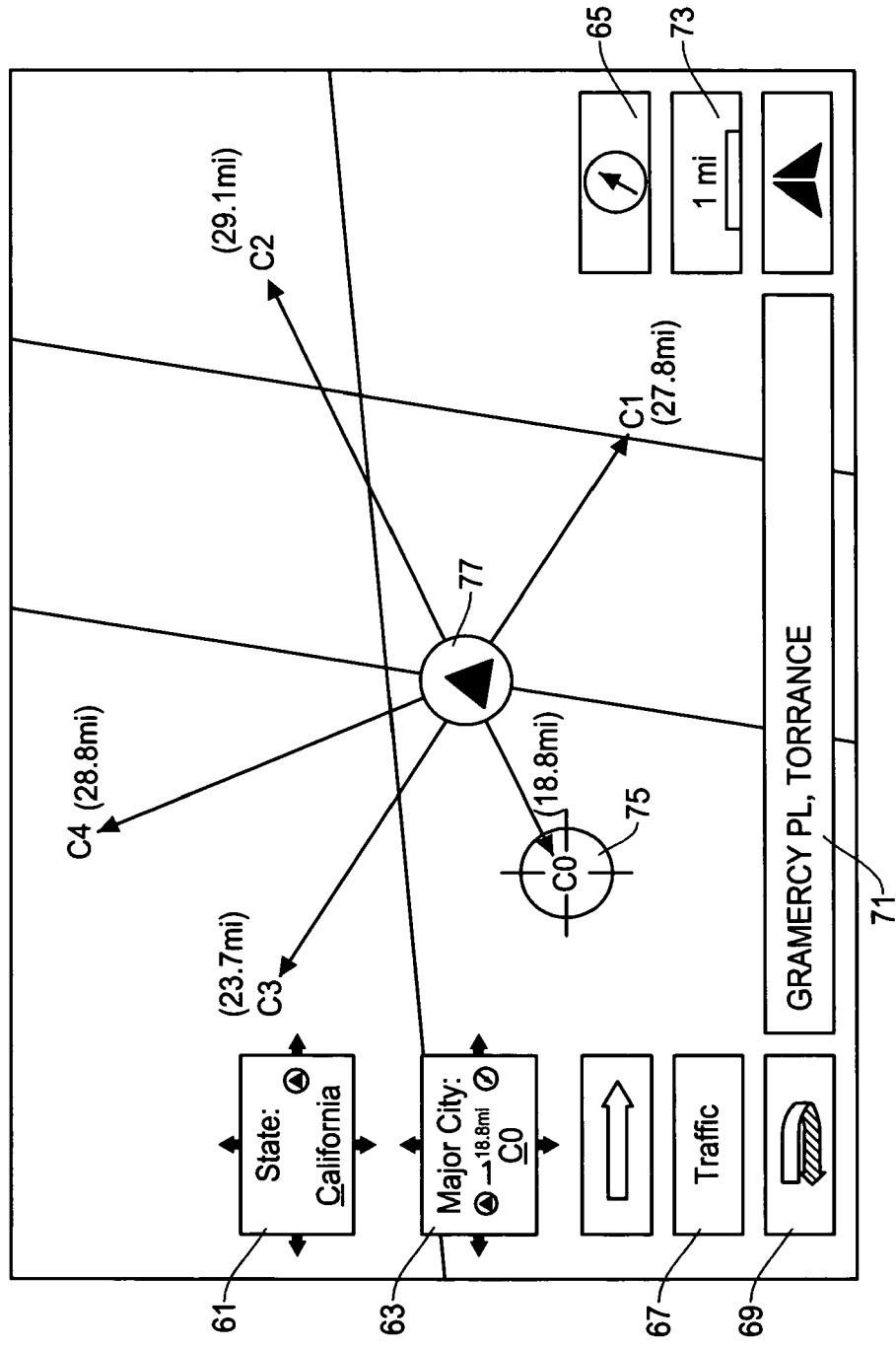
FIGS. 2A-2F are schematic diagrams showing the relationship between operations of an input device and a city search procedure under the present invention where the vehicle is located in the chosen state.

Referring now to FIG. 2A, the relationship between movements of input device such as joystick and operations of city search is described in detail. As shown in FIG. 1, it is assumed that the first letter "C" is selected in the city selection box 63 and the vehicle is currently located within the state of California. The navigation system moves the cursor 75 to the city that starts with the letter "C" and located nearest to the current vehicle position 77, which is the city of "Carson".

If the city "Carson" is not the one that the user is searching, in the preferred embodiment, by any directional movement through the input device, the cursor 75 moves, in the order of distance, to the other cities that start with the letter "C". This operation is shown in FIGS. 2A-2D where the city locations which are represented by city names C0 to C4 are shown around the current vehicle location indicator 77 where the city C0 represents the city of "Carson" in the above example. Although abbreviated, it is assumed that the city names C0 to C4 represent major cities within the state of California whose name start with the character "C".

The distance from the current vehicle location 77 to each city location is shown in the parenthesis next to each of the city names. For instance, the city C0 is located about 18.8 miles away from the current vehicle location 77, and the city C2 is located about 29.1 miles away from the current vehicle location 77. In this situation, the navigation system will find a city based on the distance from the current vehicle location 77 by shifting the cursor 75 to the city on the map image.

Namely, since the user has selected the letter C as the initial letter of an intended city name as noted above, the navigation system will first show the nearest city that starts with the letter "C", which, in this case, is "Carson". As noted above, it is assumed that the city of "Carson" is not the one the user wanted, thus, the user operates the direction keys of the input device to further search the desired city. The navigation system detects the direction specified by the user and moves the cursor 75 to the location of the city in response to every operation of the input device in the order of distance in the specified direction.

Figure 2B:
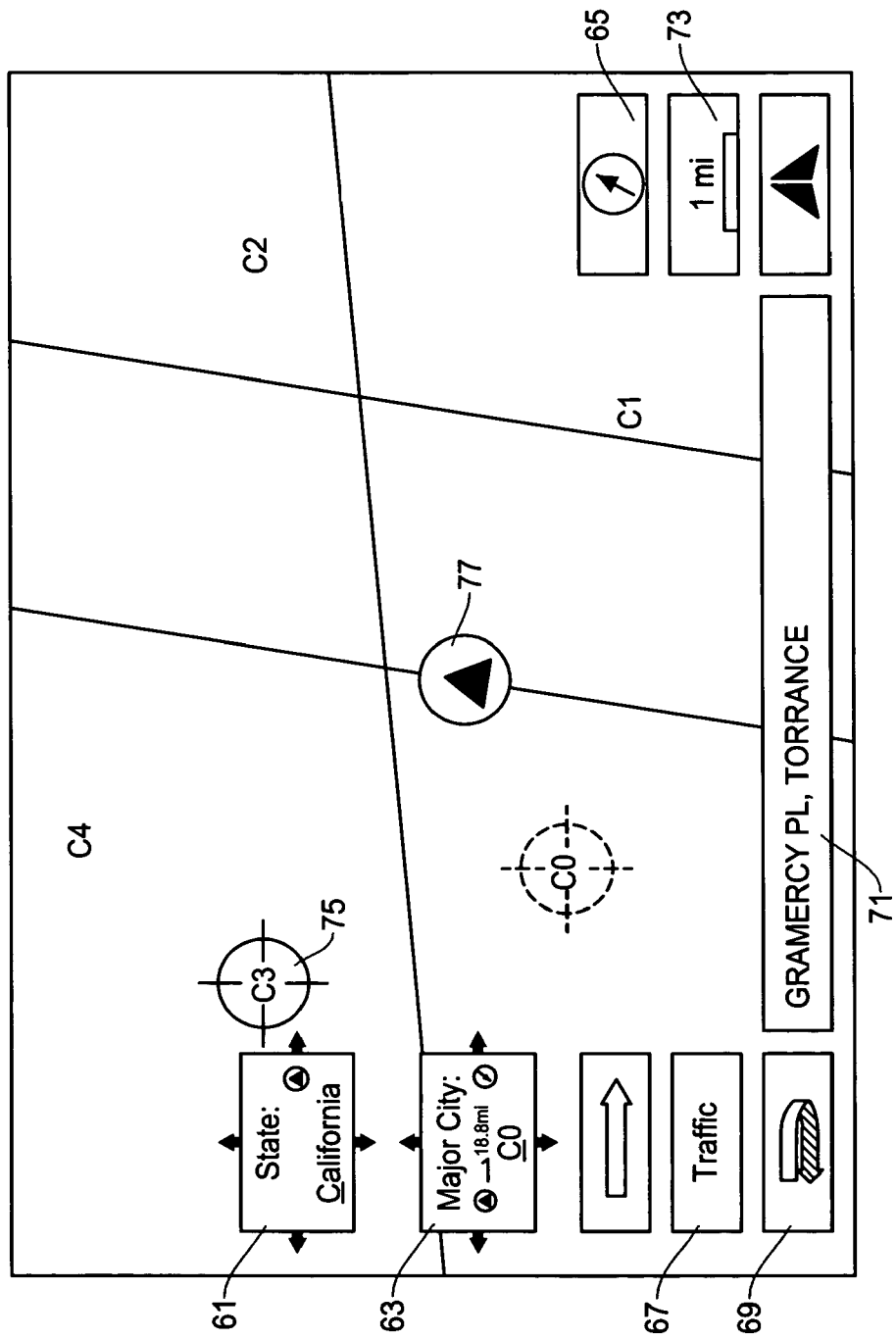
Figure 2C:
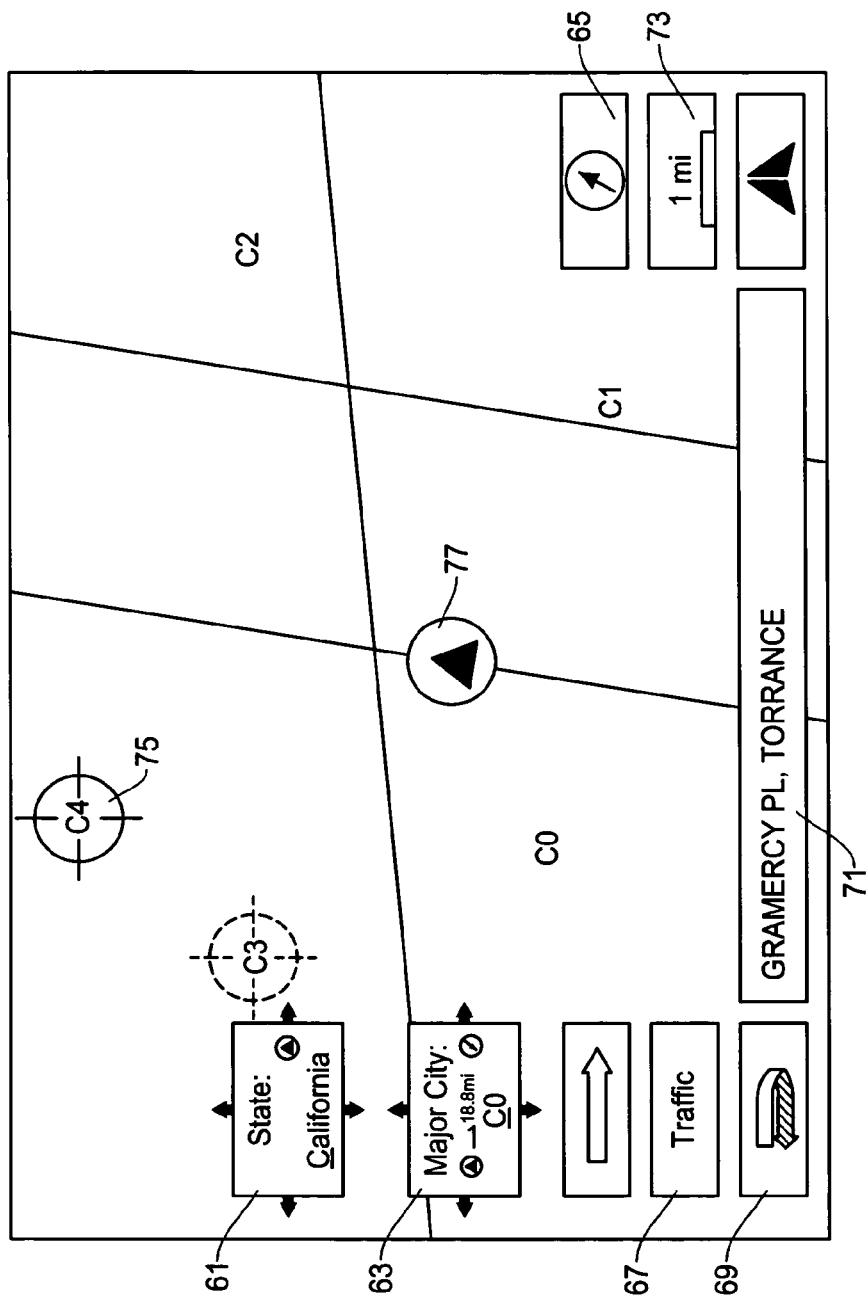
Figure 2D:
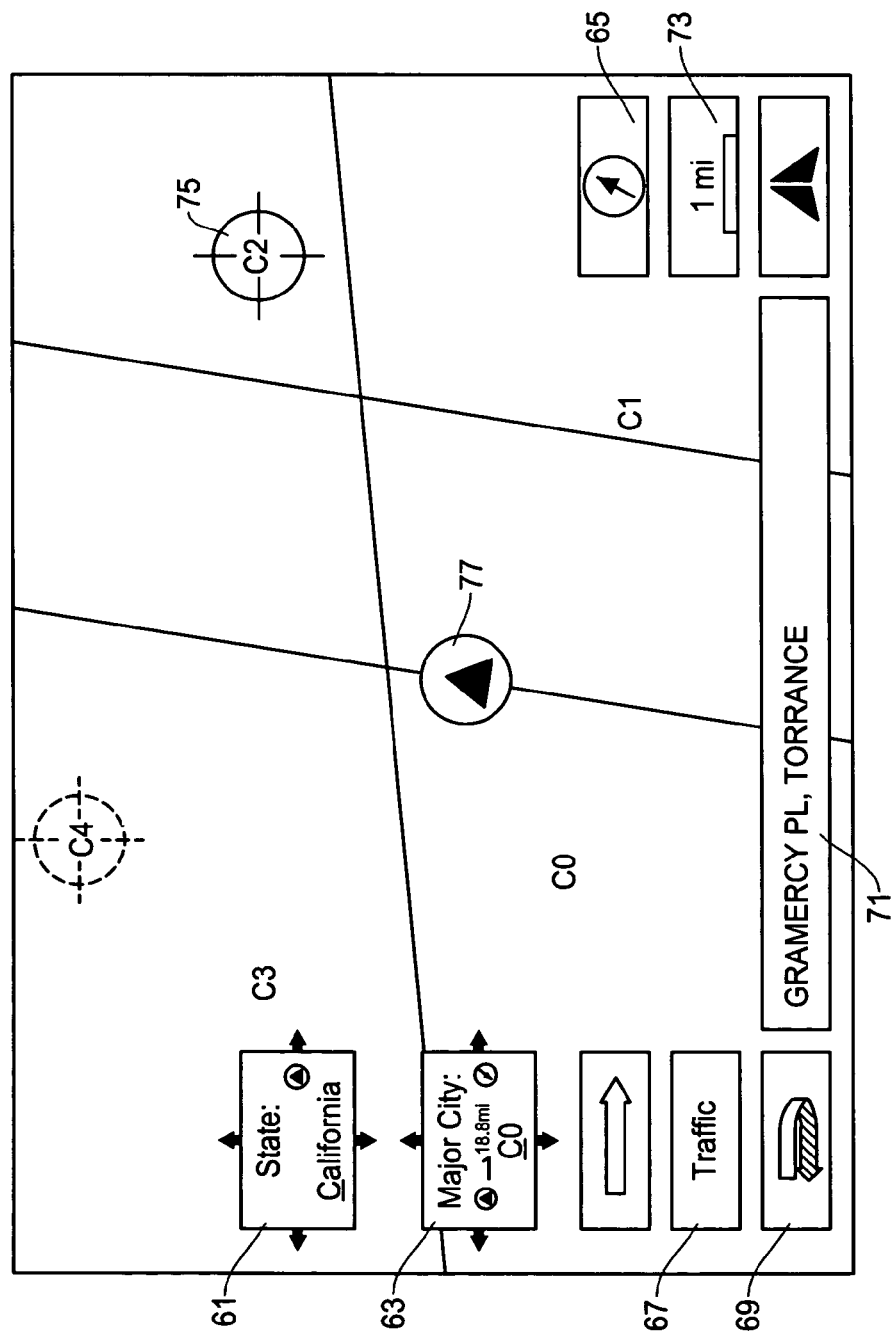

In FIGS. 2B-2D, the user is able to find the next city by the directional movement of the input device so that the navigation system moves the cursor 75 to the next nearest city that starts with the letter "C" with respect to the specified direction. For example, when the user presses the input device (ex. joystick) in the up (North) direction, the navigation system will detect the specified direction and move the cursor 75 from the city C0 which represent the city of "Carson" to the city positions in the order of C3, C4, and C2. This is the order of distance from the current vehicle position 77 to the cities located in the upper direction of the city C0.

More specifically, since the city C3 is the closest (23.8 miles) to the current vehicle location 77 in the upper direction, as the user presses the "up" key of the input device, the cursor 75 moves to the city C3 as shown in FIG. 2B. In the drawings, the cursor mark represented by the dotted line indicates a previous location of the cursor 75. As the user presses the up key again, the cursor 75 moves to the city C4, which is the second closest city from the current vehicle location 77 as shown in FIG. 2C.

As the user presses the up key again, the cursor 75 moves to the city C2, which is the third closest city from the current vehicle location 77 as shown in FIG. 2D. In this case, although the city C1 is closer to the current vehicle position 77 than the cities C4 and C2, it is not selected since it is in the South of the city C0. In this manner, every time the user activates the up key, the navigation system shows the location of the city that exists in the upper direction by moving the cursor 75 thereto.

Figure 2E:
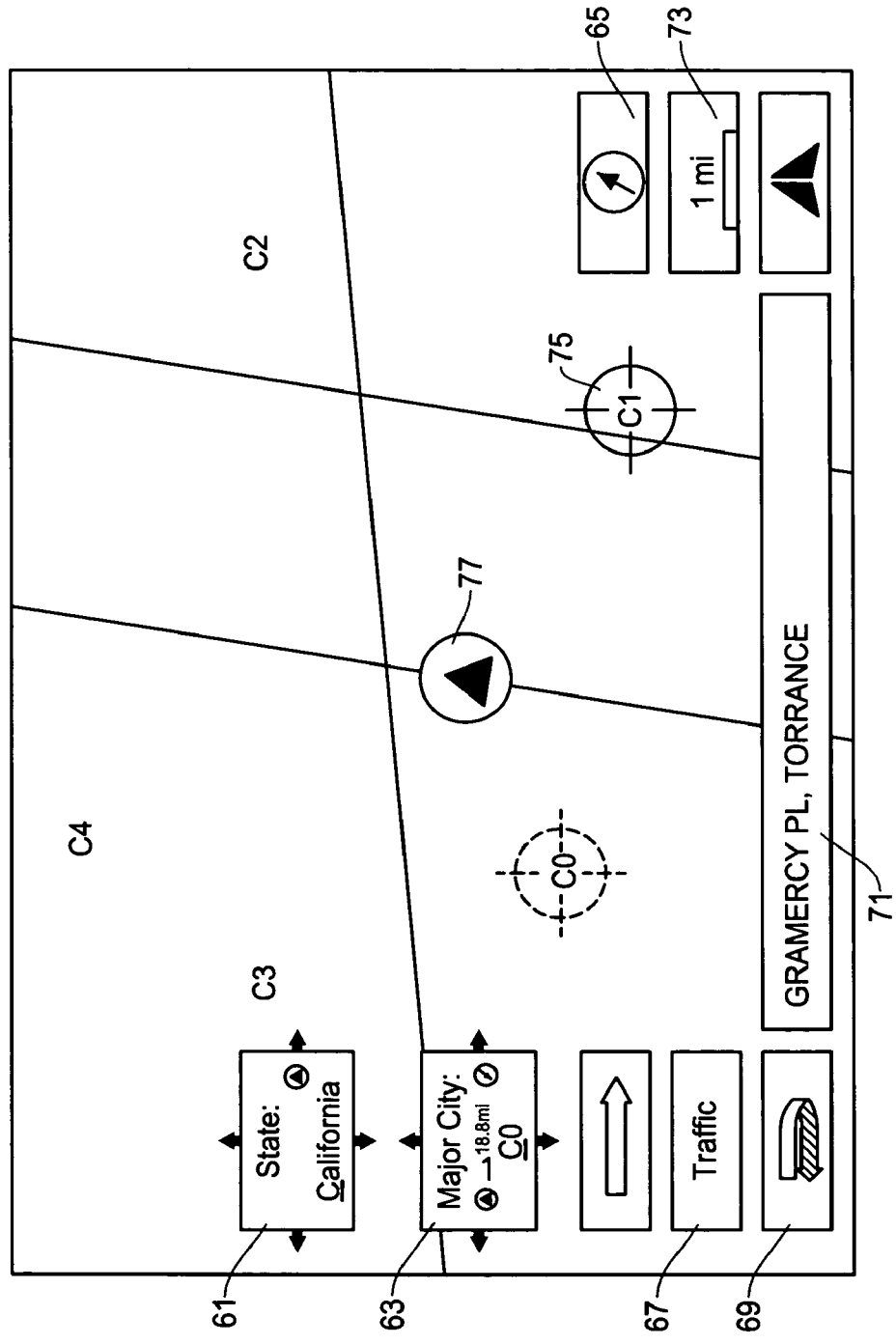

Similarly, when the user presses the "down" direction key (South), the navigation system detects the specified direction and moves the cursor 75 to the city C1 as it is the nearest city that is located in the down direction from the city C0 as shown in FIG. 2E. Similarly, when the user presses the input device to the right direction, the navigation system will move the cursor 75 to the city C1 and then to the city C2 as they are the cities located to the right (East) of the current vehicle position 77. As noted above, the city C1 is selected first since it is closer to the current vehicle location 77 than the city C2.

Pressing the left direction (West) of the input device works in the same manner as described above by changing the position of the cursor 75 to the position of the candidate city. In this case, aside from the city C0, the next city that is located closest to the current vehicle location 77 is the city C3. Thus, the user is able to find the city by its relative location to the current vehicle position 77 or the location of previous city, thereby intuitively searching a target city.

Figure 2F:
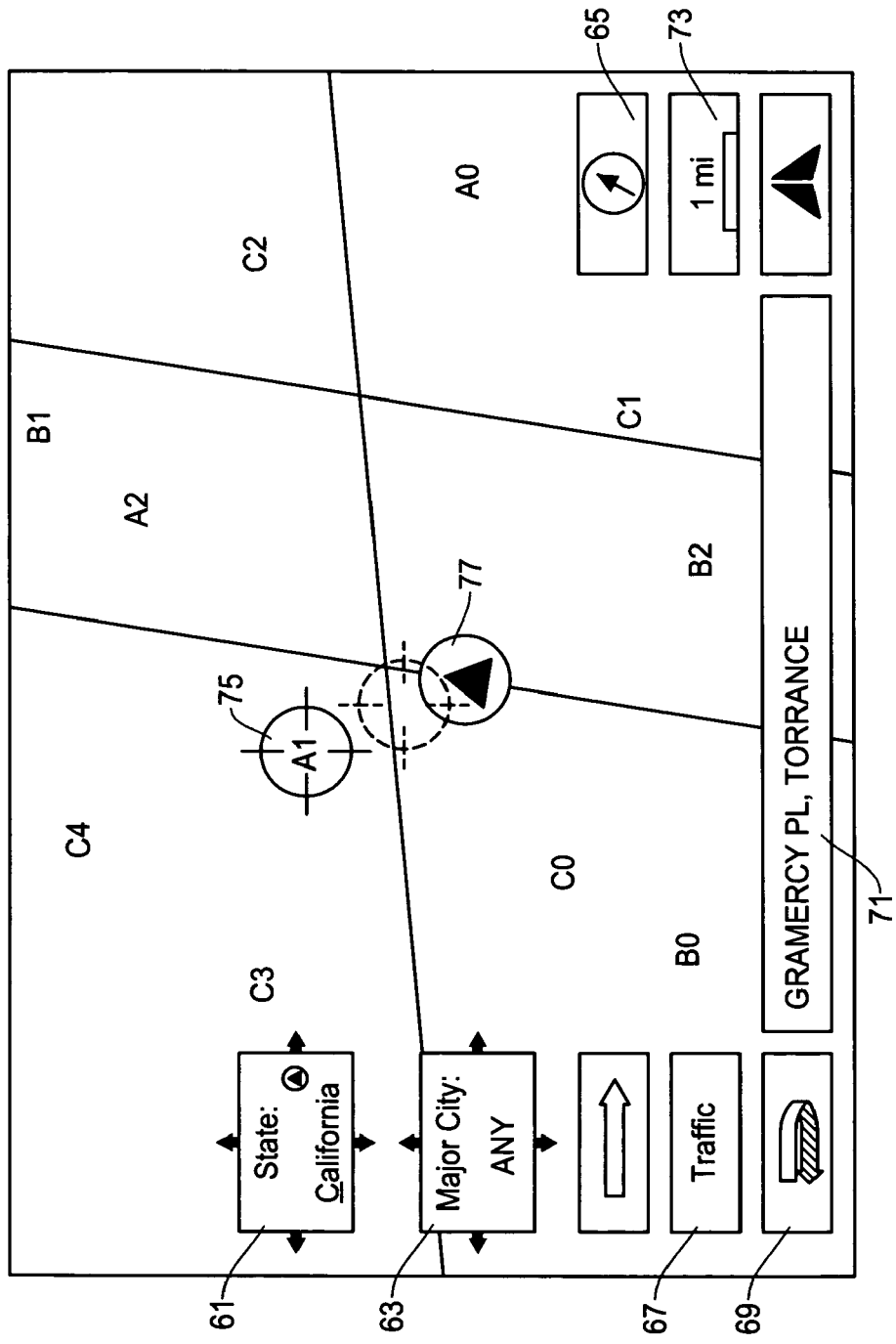

Although the cursor 75 is moved from the start point of the city C0 in the above example, it is also possible to shift the cursor 75 from the current vehicle position 77 as a start point. This example is shown in FIG. 2F where cursor 75 starts from the current vehicle position 77 rather than the city C0 and first moves to a city A1 which is the closest to the current vehicle position 77. This situation may arise when the user presses the direction keys without specifying a first character of the cities so that the navigation system searches any city in the order of distance from the current vehicle position 77.

In the above example, the invention has been described for the situation where the vehicle is located in the chosen state which is automatically selected as default. There arises a situation where the user has specified the state but the current vehicle (user) position is not in the specified state, for example, the vehicle is currently located in California and the selected state is Arizona. In such a situation, in the search method of the present invention, the navigation system will search the city, in response to the directional movement of the input device, based on the distance from the selected city rather than the current vehicle position.

Figure 3A:
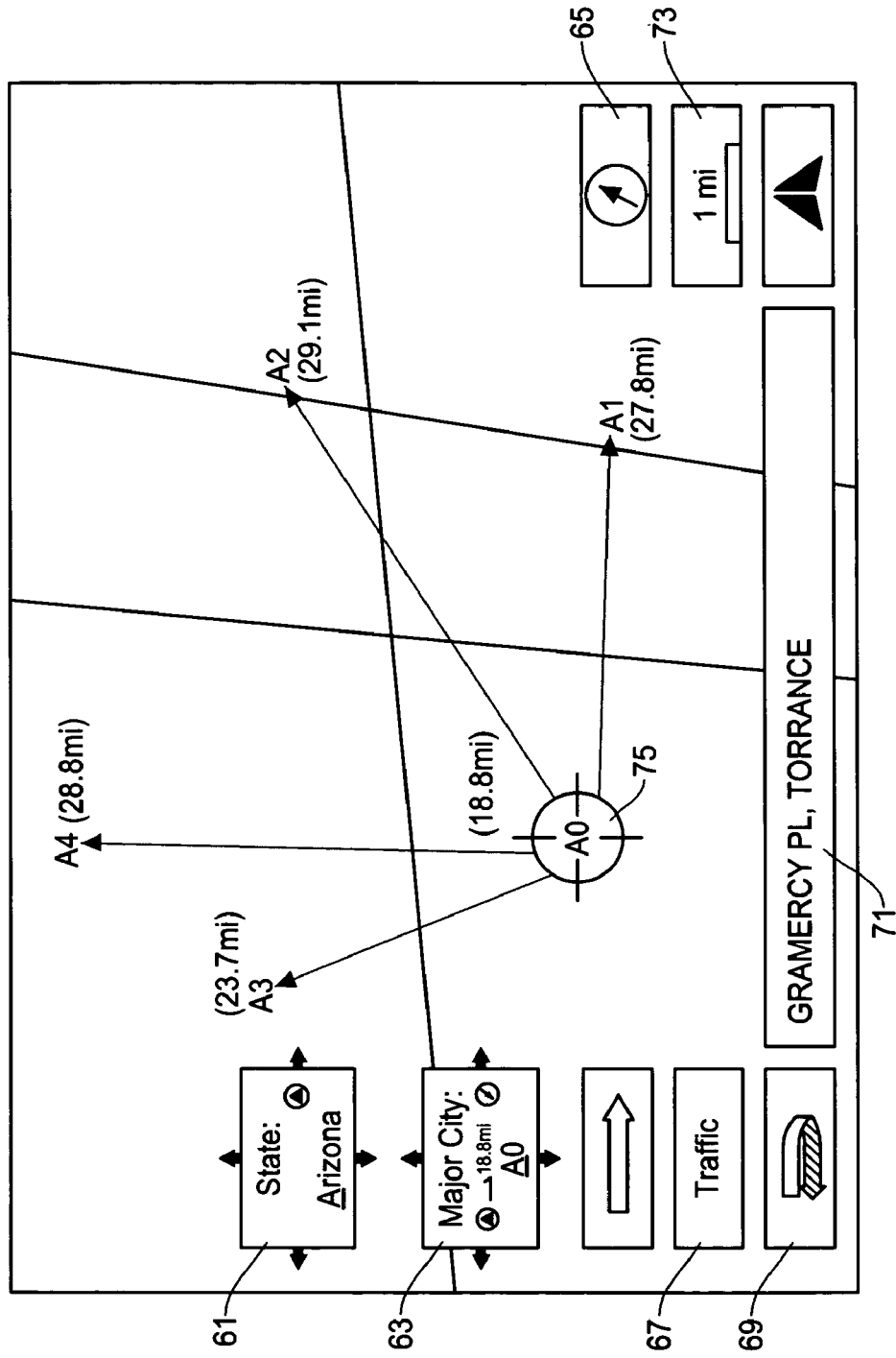
FIGS. 3A-3C are schematic diagrams showing an operation of the display method and apparatus of the present invention for searching a city when the vehicle is not located within the chosen state.
Figure 3B:
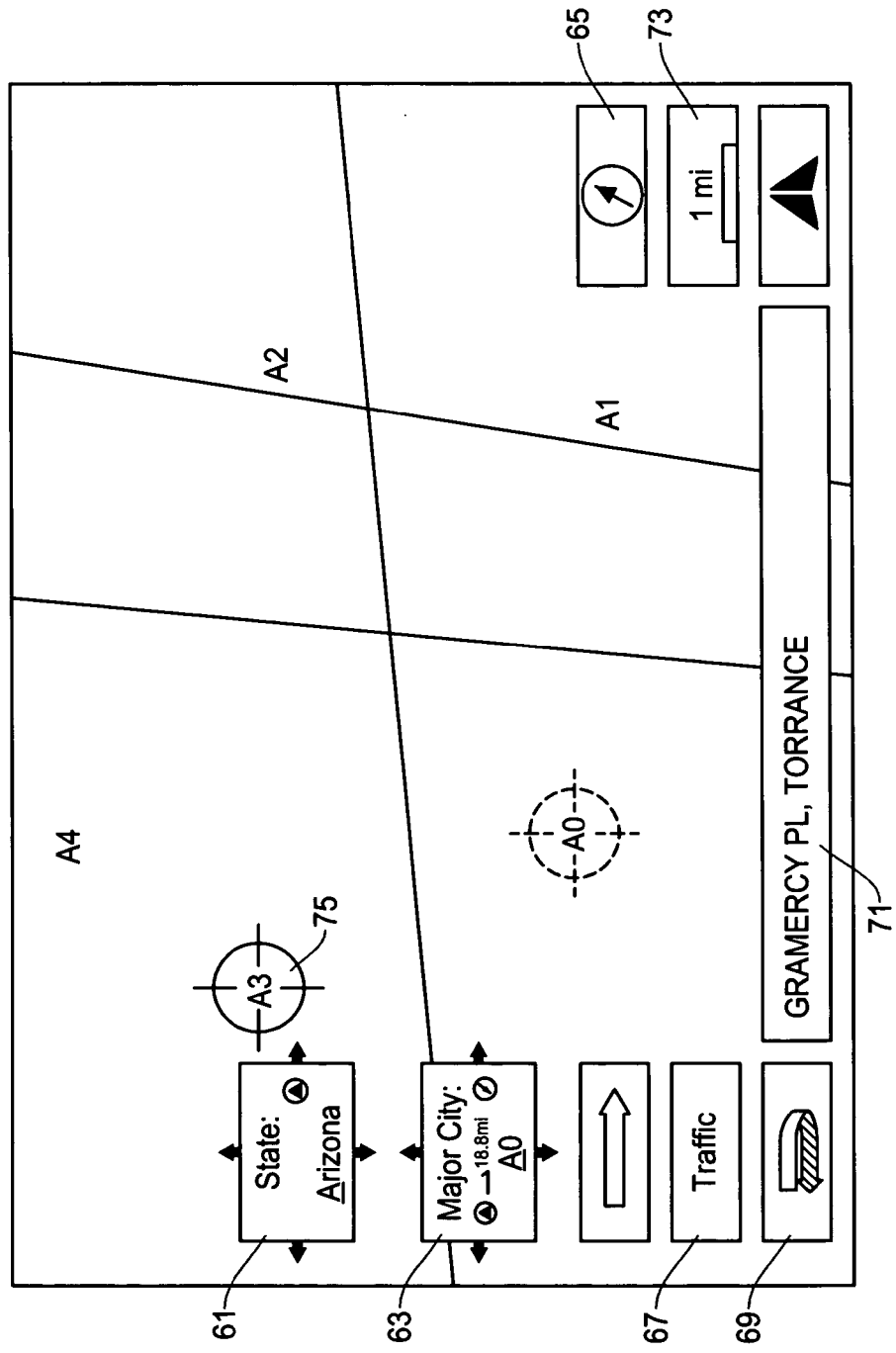
Figure 3C:
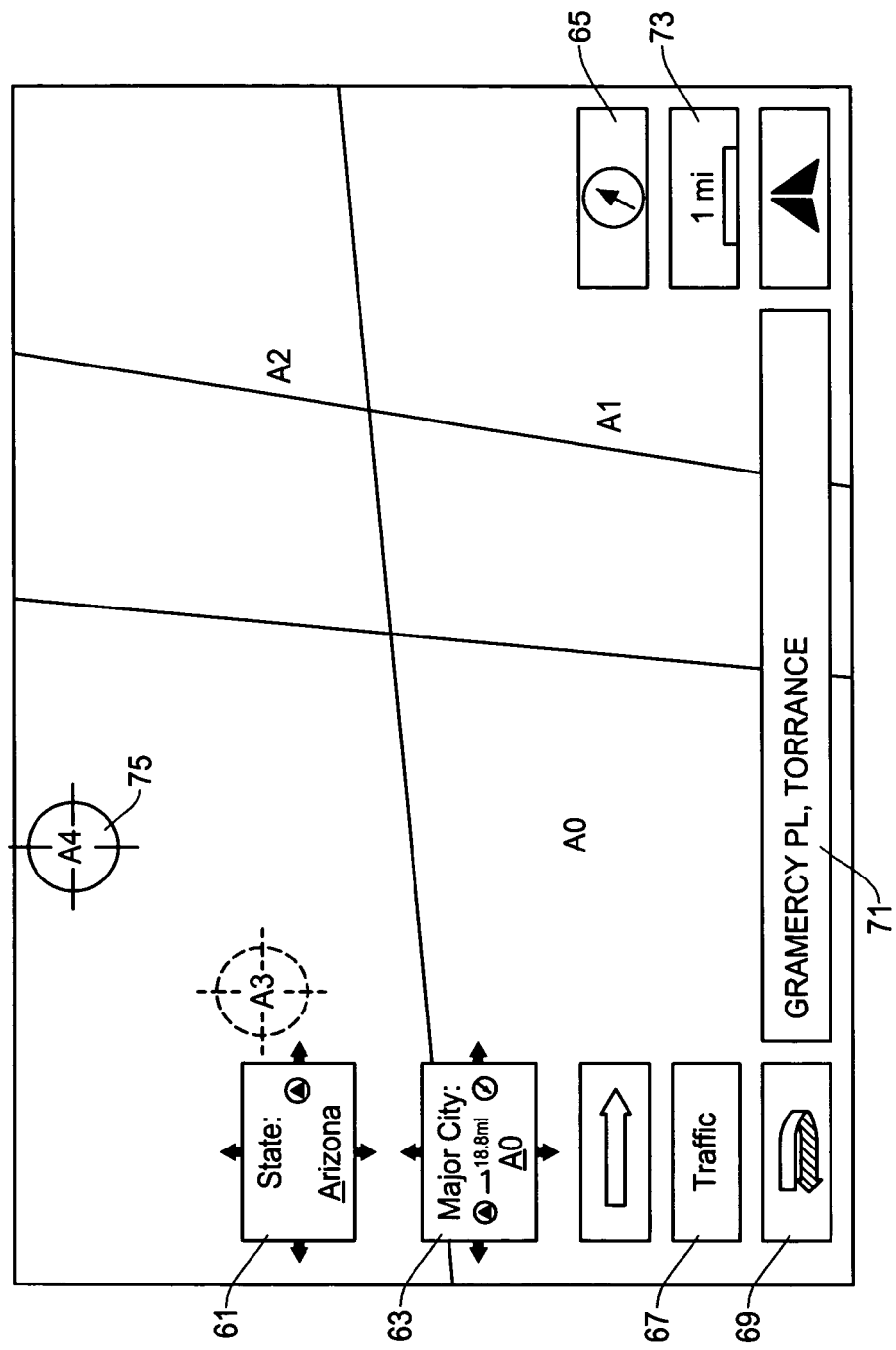

FIGS. 3A-3C are schematic diagrams showing the operation of the display method for conducting the city search in such a situation where the vehicle is not located within the chosen state. This example assumes that the vehicle is currently located in California while the user is trying to find a particular city in the other state, Arizona. In this example, it is also assumed that a city name A0 on the map is the location of the city in the state of Arizona initially selected by the user through the operation of the city selection box 63 noted above.

As shown in FIG. 3A, the cursor 75 is placed on the city A0 in Arizona which is the initially chosen city by the user while the current vehicle position mark is not on the map image. The user is able to move the cursor 75 to other cities having the same first character with every activation of the direction key in the manner similar to that of FIGS. 2A-2F. For example, when the user repeatedly presses the joystick to the up direction, the navigation system will detect the specified direction and move the cursor 75 from the city A0 to the city position in the order of distance. Namely, the cursor 75 is changed to the cities A3, A4, then A2 that are located in the upper direction (North) from the currently selected city A0.

More specifically, since the city A3 is the closest (23.8 miles) to the preselected city A0 in the up direction, as the user presses the up direction key of the input device, the cursor 75 moves to the city A3 as shown in FIG. 3B. As the user further presses the up direction key, the cursor 75 moves to the city A4 as shown in FIG. 3C, which is the second closest city from the city A0, and so on. Similarly, by pressing the right direction key by the joystick, the navigation system will move the cursor 75 first to the city A1, and then to the city A2 according to the distance from the preselected city A0.

It should be noted that the situation and manner of operation shown in FIGS. 3A-3C (no current vehicle position displayed) may also be applicable when the search area (first city specified by the user) is far away from the current vehicle position. For example, if the vehicle is currently located in Los Angeles, Calif., and the user wants to search a city around the area of San Francisco, Calif., to display the current vehicle position mark on the screen is almost meaningless because it is too far away from the search area. Thus, is such a situation, the display example and operation of FIGS. 3A-3C will be applicable even when the user is in the chosen state.

In the above cases, the user has set the first letter of the city name so that the name of the cities to be searched start with the specified letter. Rather than specifying a first letter of the cities, the user may simply select a state and proceed to find any city without specifying the first letter. Such an example is shown in the schematic diagram of FIG. 4B which includes an example of a state selection box 61 and a city selection box 63 involved in such a situation.

In this example, the state of Arizona has been selected, but the city name is set to "ANY", which indicates that any city can be a candidate. The navigation system will display a map scroll pad to scroll a map image on the display screen so that the user can find a desired location (FIG. 7C). In the alternative, the navigation system may search and display the cities not based on the initial letter but only by distance in the manner similar to that described above with reference to FIG. 2F.

The basic operational steps for searching a desired city on the map screen under the present invention are described with reference to the flow chart of FIG. 5. First, in the step 101, the user selects the desired state by selecting a state selection box 61. In the step 102, the user specifies the desired state name in the state selection box 61, an example of state selection box is shown by the enlarged views of FIGS. 4A and 4B.

As described above, the user may change the first letter of the state name by pressing the up direction or down direction key of the input device, and may change the candidate state names having the selected first letter of the state name by pressing the right or left direction key. The user may skip this process of the steps 101 and 102 if it is not necessary to change the default state indicated on the display screen. The default state is the state where the vehicle (user) is currently located which is automatically set by the navigation system.

In the step 103, the user selects a city selection box 63 on the screen. In the step 104, the user specifies a city name in the similar manner to that in the procedure for selecting the state name. Namely, the user may change the first letter of the city name by pressing the up direction or down direction key of the input device, and may change the candidate city names having the selected first letter of the city name by pressing the right or left direction key. At this step, the user may select "ANY" to find cities regardless of the first letter of the city name. As noted above with respect to selecting the state and city, the allocation of the roles of the up and down keys (first set of keys) and the right and left keys (second set of keys) noted above are not fixed but mutually exchangeable.

At the step 105, the procedure will branch off based on whether the user has pressed a directional key of the input device for specifying a search direction. If a particular direction is specified, the procedure moves to the step 106 to find candidate cities in the specified direction. On the other hand, if the direction is not specified in the step 105, the procedure will wait the user's input to specify a desired direction to search the city.

As the user determines the first letter of the city name, the user is able to find a desired city by using the input device such as a joystick to specify the direction for searching the city. The navigation system finds the candidate cities that exit in the direction specified by the user. Thus, in the step 107, at each operation of the direction key of the input device, the navigation system moves the cursor 75 to the nearest city in the specified direction. Therefore, the user is able to see the name and location of the candidate cities on the map image in the order of distance from the current vehicle position (when the vehicle is located in the chosen state) or from the selected city specified in the city selection box 63 (when the vehicle is located out of the chosen state or too far away from the searching area, etc).

Figure 5:
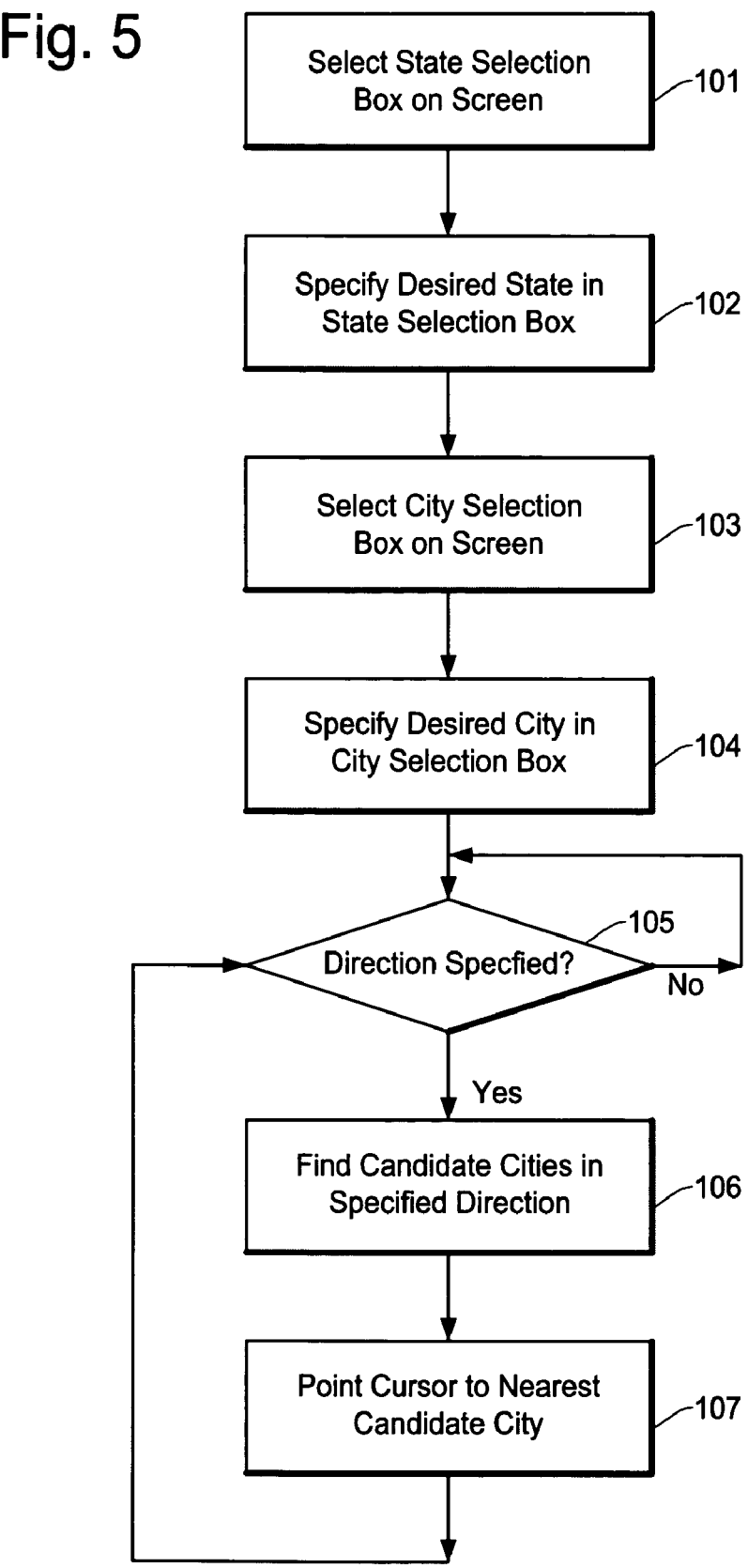
FIG. 5 is a flow chart showing an example of basic operational steps of searching a desired city under the display method of the present invention.
Figure 6:
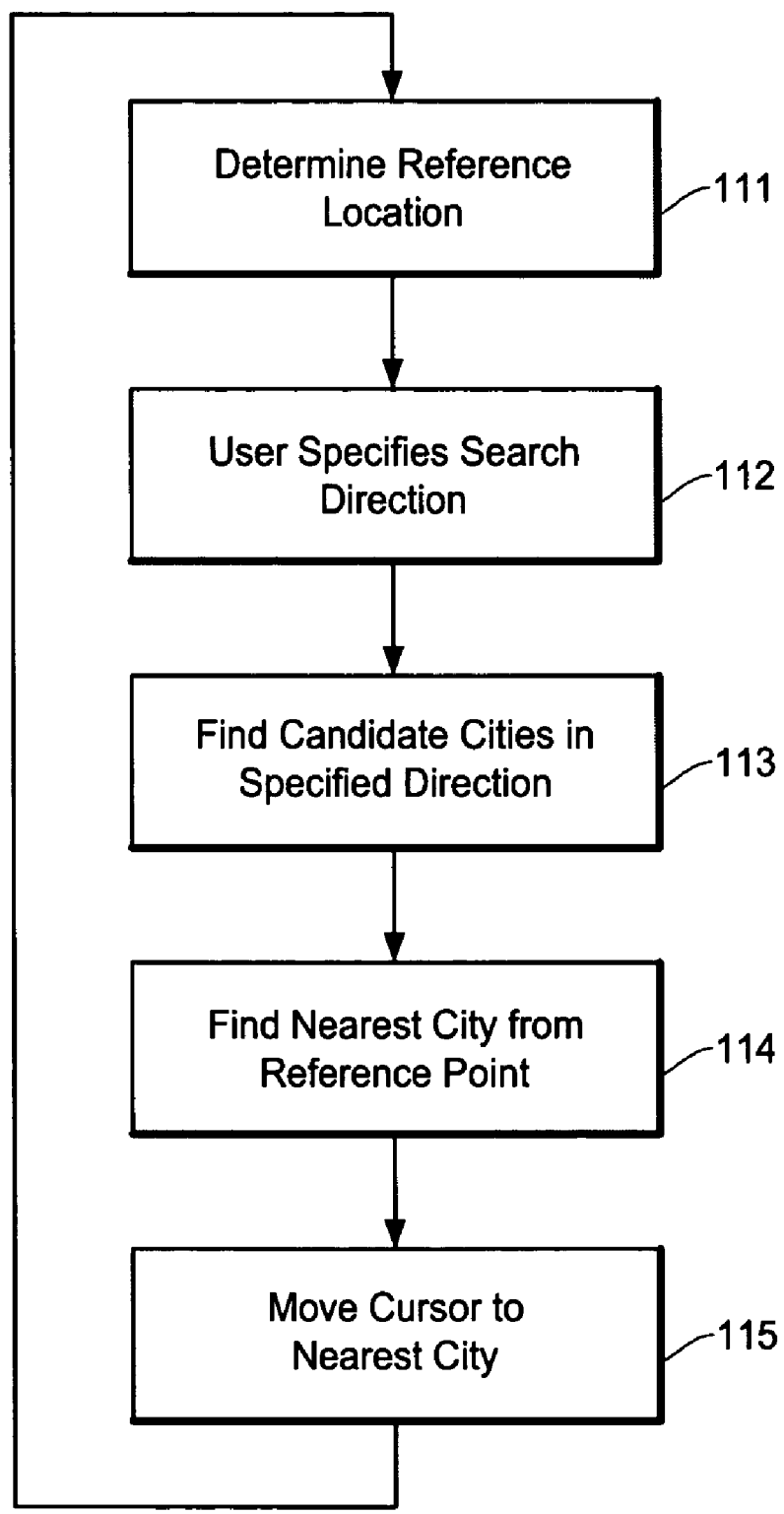
FIG. 6 is a flow chart showing an example of detailed operational steps for searching a desired city under the display method of the present invention.

The flow chart of FIG. 6 shows the detailed operational steps of the city selection procedure under the present invention that correspond to the steps 106 and 107 in the flow chart of FIG. 5. In the first step 111, the navigation system will determine a reference location which is a location to determine a direction to search the cities when the direction key is activated by the user. When the vehicle is located within the chosen state, as in the case of FIG. 2A, the reference point is either the current vehicle position 77 or the first city derived from the input in the city selection box 63 by the user.

In the examples of FIGS. 2A-2E, the current vehicle position 77 is a reference location in terms of determining a distance to each candidate city while the city C0 is a reference location in terms of determining a direction to search the candidate cities. When the vehicle is not located in the chosen state or too far away even located in the chosen state, as in the case of FIG. 3A where the user wants to search the cities in the other state or in the area that is far away, the reference point is a city shown in the city selection box 63. This is because the current vehicle position 77 cannot be displayed on the map image since the user is not in the state or otherwise too far away from the area where the cities are to be searched.

In the next step 112, the user operates the input device such as a joystick to specify direction of the search area in North (up), South (down), West (left) or East (right) direction. Based on these direction criteria, the navigation system searches the candidate cities in the step 113 in the direction with respect to the reference location. In the step 114, the navigation system searches the candidate cities in the order of distance from the reference location. When the nearest city is found in response to each operation of the direction key, the navigation system moves the cursor 75 to the nearest city in the map on the display screen in the step 115. The above procedure will be repeated until the user finds a desired city.

Figure 7A:
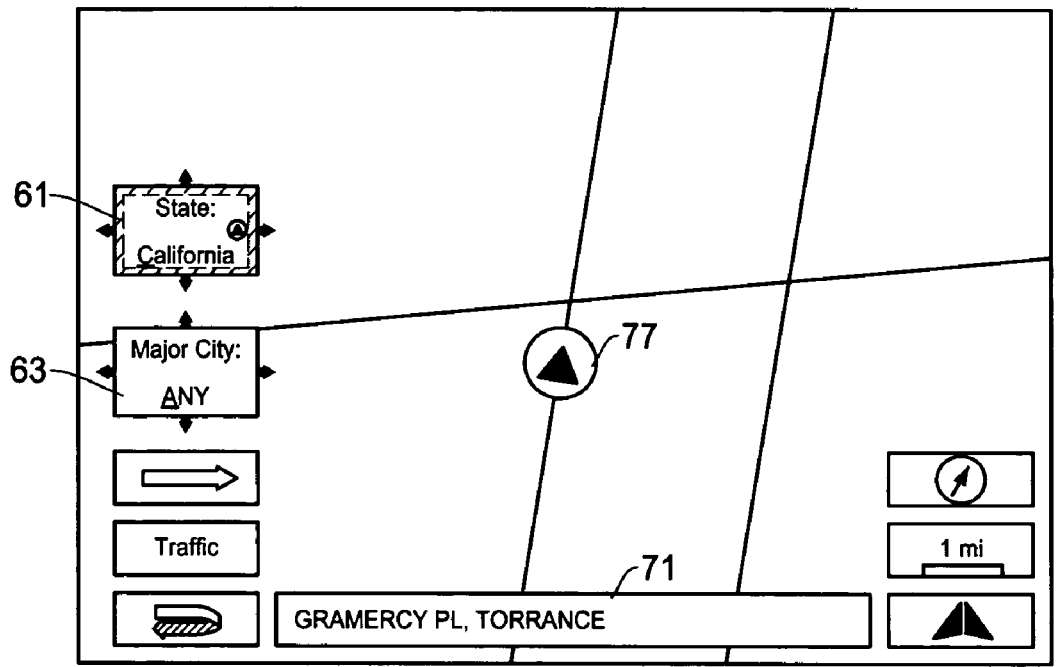
FIGS. 7A to 7H are schematic diagrams showing examples of screen display and procedure for finding a desired city under the present invention.
Figure 7B:
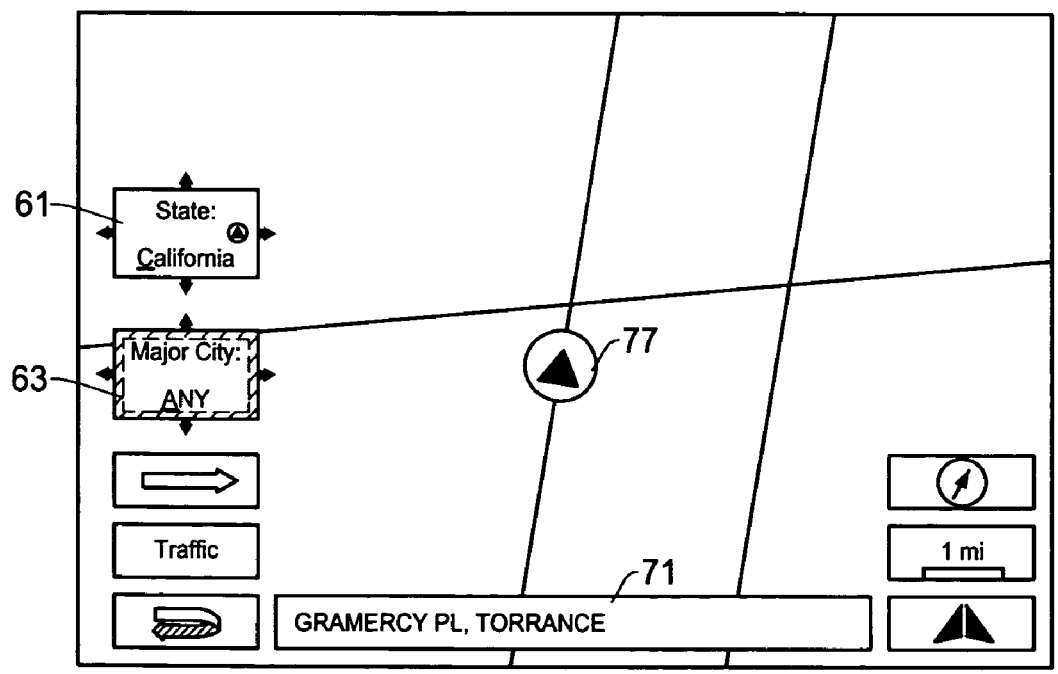
Figure 7C:
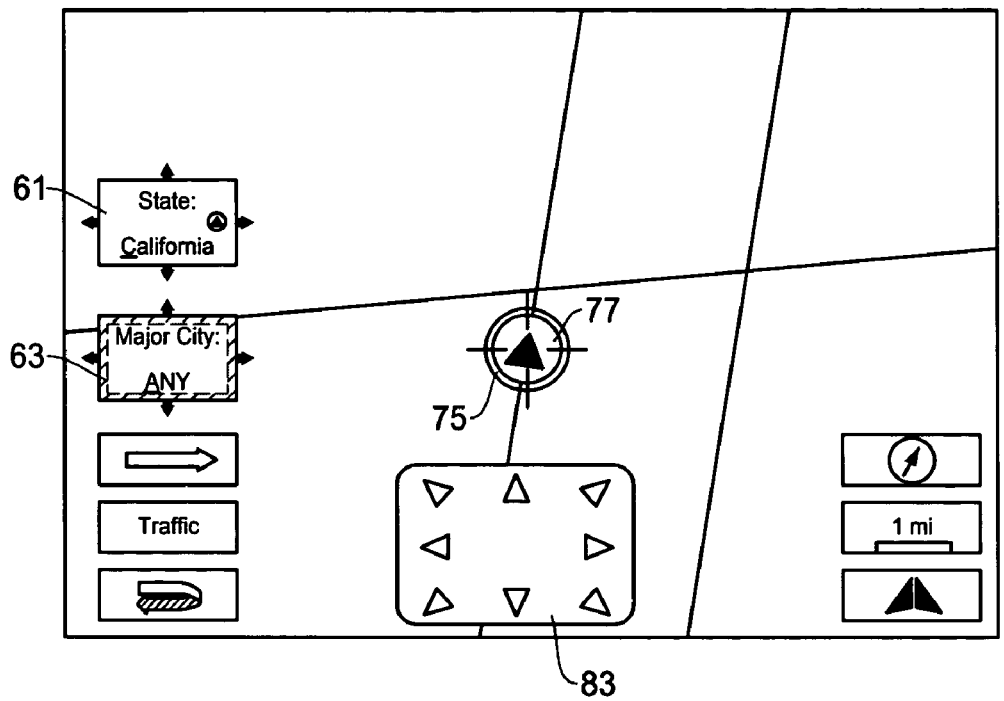

FIGS. 7A to 7H are schematic diagrams showing examples of screen displays and basic operational processes involved in the display method for city search under the present invention. In the example of FIG. 7A, the state selection box 61 is highlighted and the user has selected California for the city search operation. As noted above, the user may change the first letter of the state name by pressing the up direction or down direction key of the input device, and may change the candidate state names having the selected first letter of the state name by pressing the right or left direction key.

When the user selects the city selection box 63 by means of a joystick or other input device, the screen shown in FIG. 7B is displayed in which the city selection box 63 is highlighted.

Figure 7D:
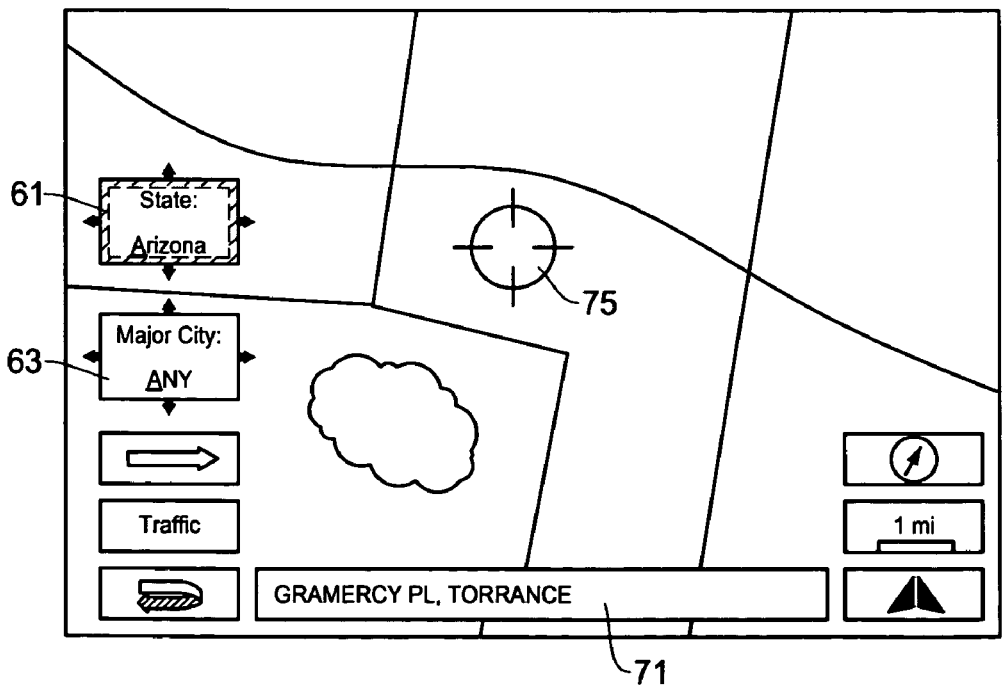

When the user sets the city selection to "ANY" in the situation of FIG. 7B, the navigation system displays a scroll key 83 as shown in FIG. 7C so that the user can move the map in a desired direction. If the user has changed the state from the display in FIG. 7A to other state such as Arizona through the direction keys, the navigation system displays a screen as shown in FIG. 7D.

Figure 7E:
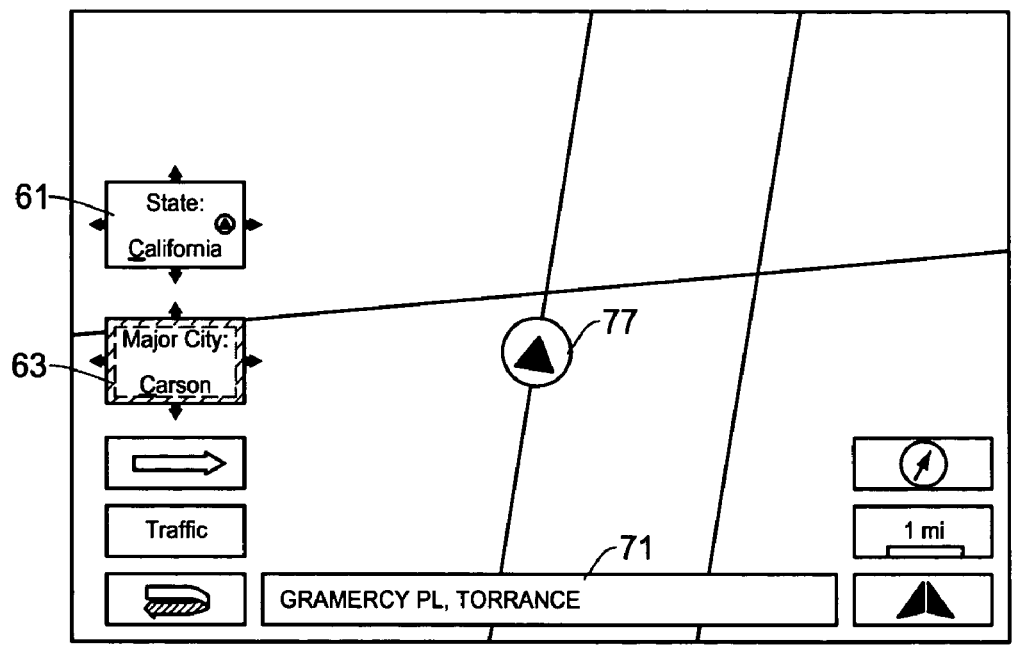
Figure 7F:
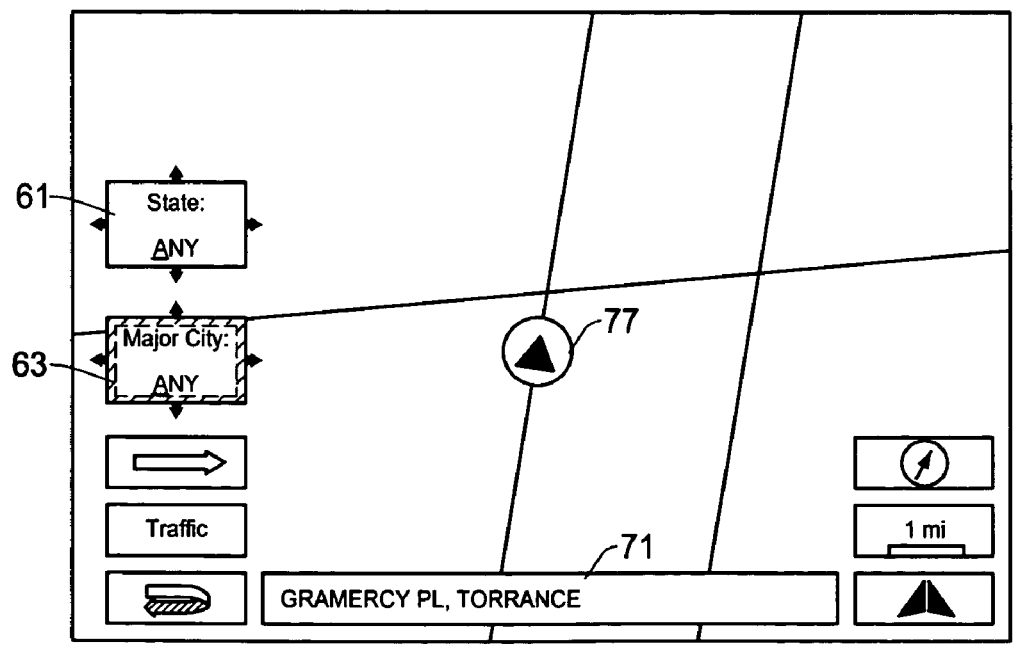
Figure 7G:
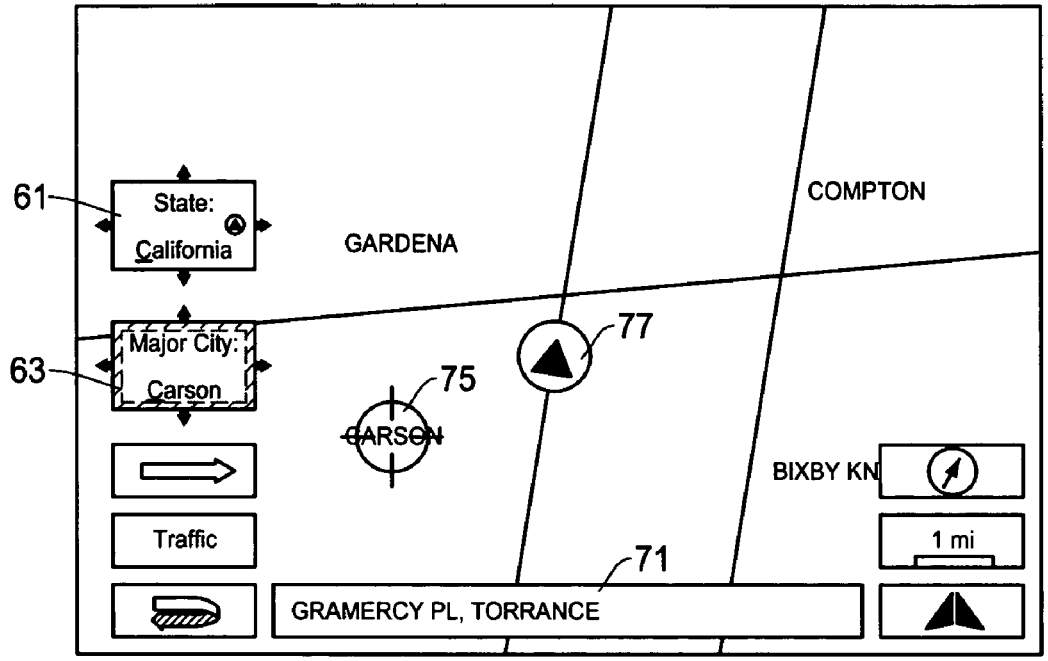

The user may change the city name by selecting the city selection box 63 as shown in the screen example of FIG. 7F where the city selection box 63 is selected and highlighted. As noted above, the user may change the first letter of the city name by pressing the up direction or down direction key of the input device, and may change the candidate city names having the selected first letter of the city name by pressing the right or left direction key. FIG. 7E shows a situation where the city is changed from "ANY" to "Carson" in the city selection box 63, thus, the navigation system will move the cursor 75 to the city of Carson as shown in the screen example of FIG. 7G.

Figure 7H:
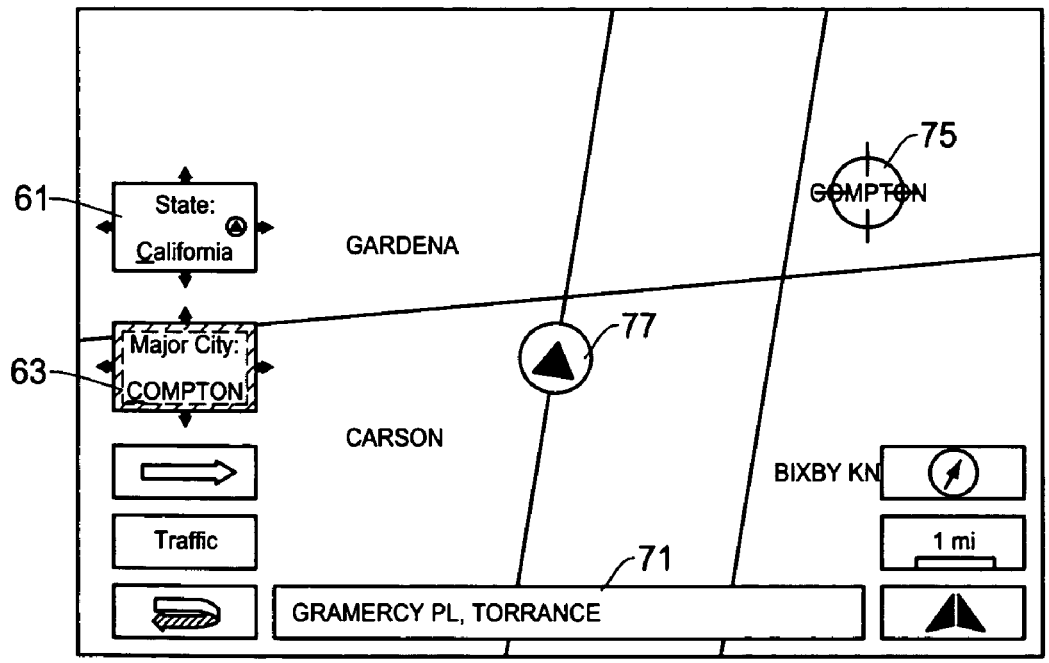

The cursor 75 will be placed on other city such as Compton as shown in FIG. 7H when the user presses the direction key to the up (North) direction since Compton is the city with the first letter "C" as that of Carson and is located in the North direction from the city of Carson. As noted above, when there are two or more cities with the same first letter, the navigation system changes the cursor position to the next city in the order of distance from the reference location such as a current vehicle location.

Figure 8:
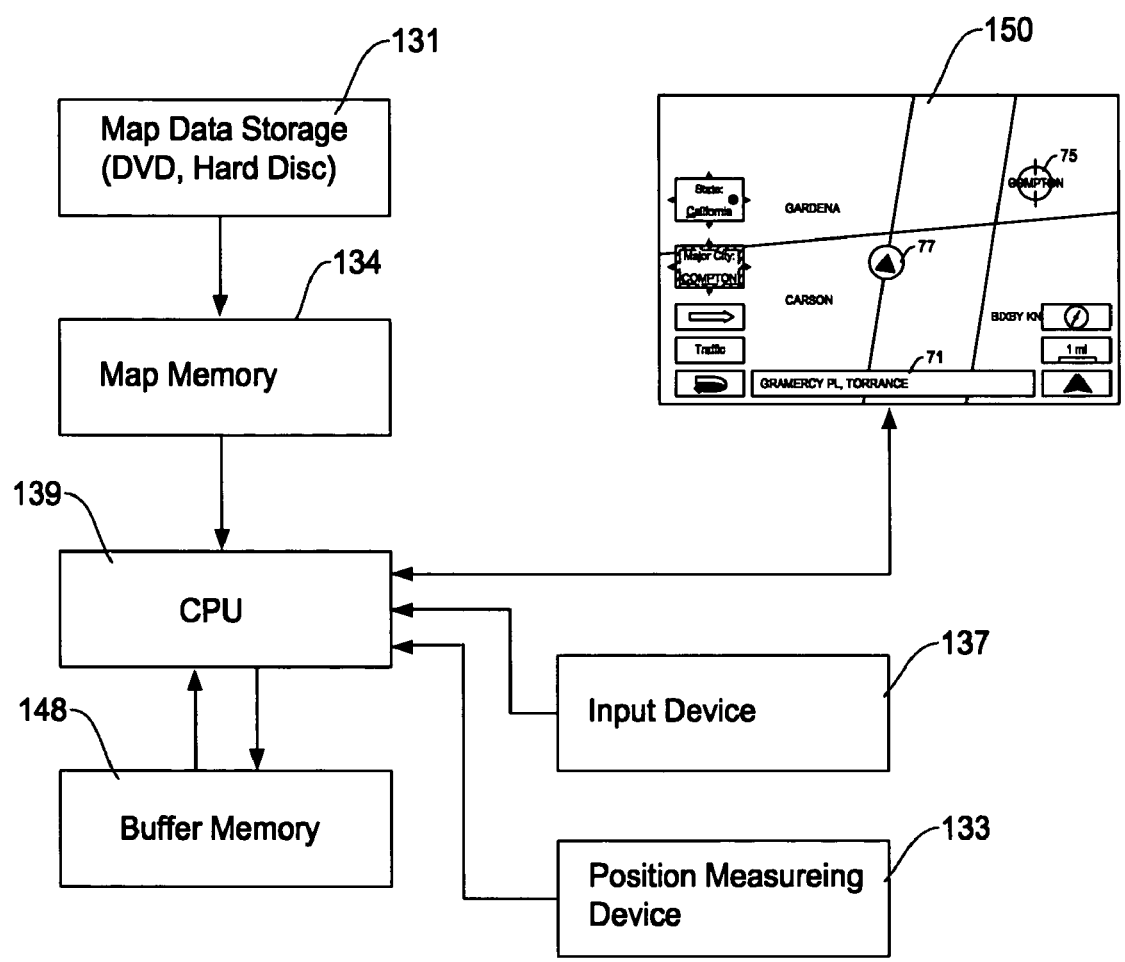
FIG. 8 is a block diagram showing an example of functional structure of the apparatus under the present invention for quickly searching a desired city on the map image on the screen.

FIG. 8 is a functional block diagram showing an example of basic structure of the display apparatus of the present invention for searching a desired city in the map image on the screen of the navigation system. The structure of FIG. 8 is applicable to any electronic device having a navigation function which enables the electronic device to guide the user to a particular location as noted above. The city search apparatus of the present invention includes a monitor 150 for graphical user interface, and a controller (CPU) 139 for controlling an overall operation of the apparatus of the present invention.

The block diagram of FIG. 8 further includes a map data storage 131 such as a DVD or a hard disc for storing map data, a map memory 134 for storing a required portion of the map data retrieved from the map data storage 131, an input device 137 such as a joystick, a remote controller or other input device for the user to select menus, change directions, scroll the screen, change the location of the cursor on the screen, etc., a position measuring device 133 for detecting a current position of the user, and a buffer memory 148 for storing data of the state names and city names in an alphabetical order for selection processing of the state name and the city name.

In FIG. 8, the display apparatus for city search under the present invention is able to retrieve the map data from the map data storage 131 and the map memory 134. Based on the retrieved map data, the display apparatus displays the map image on the monitor 150 which may include city names, current vehicle position, etc. The CPU 139 controls an overall operation of the efficient city search operation under the present invention.

When the user specifies the desired state name in the state selection box 61, the CPU 139 determines whether the specified state is a state where the vehicle (user) is currently located based on the data from the position measuring device 133. When the user specifies the desired city in the city selection box 63, the CPU 139 determines a reference location on the basis of either the current vehicle position 77 or the first city derived from the data in the city selection box 63 by the user. If a particular direction is specified by the user through the input device 137, the CPU 139 controls the display apparatus to find a candidate city in the specified direction. As noted above, at each operation of the direction key of the input device 137, the CPU 139 controls the display apparatus to move the cursor 75 to the nearest city in the specified direction. Therefore, the user is able to see the name and location of the candidate cities on the map image in the order of distance from the current vehicle position or from the selected city specified in the city selection box 63.

Figure 9:
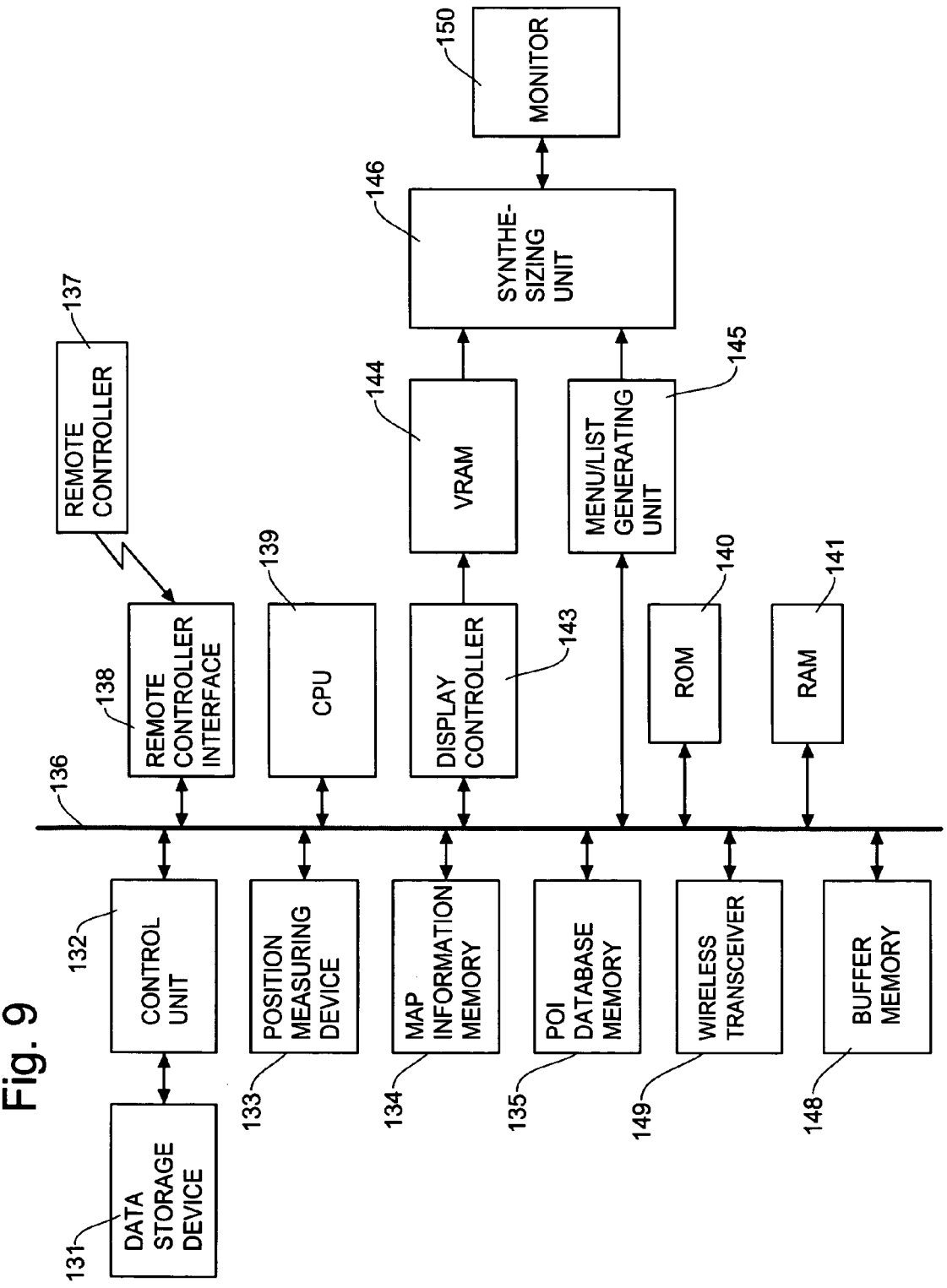
FIG. 9 is a block diagram showing an example of configuration of a vehicle navigation system implementing the city search method of the present invention.

FIG. 9 shows an example of structure of a vehicle navigation system for implementing display method for conducing the city search of the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, a wrist watch, a laptop or notebook computer.

In the block diagram of FIG. 9, the functional blocks similar to those of FIG. 8 are denoted by the same reference numerals. The navigation system includes a data storage medium 131 such as a hard disc, CD-ROM, DVD or other storage means for storing the map data. The navigation system includes a control unit 132 for controlling an operation for reading the information from the data storage medium 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving and analyzing GPS signals, and etc.

The block diagram of FIG. 9 further includes a map information memory 134 for storing a portion of the map data relevant to the intended operation of the navigation system which is read from the data storage medium 131, a database memory 135 for storing database information such as point of interest (POI) information which is read out from the data storage medium 131, a remote controller 137 for executing a menu selection operation, cursor movements, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller.

In FIG. 9, the navigation system further includes a bus 136 for interfacing the above functional blocks in the system, a processor (CPU) 139 for controlling an overall operation of the navigation system, a ROM 140 for storing various control programs such as a route search program and a map matching program necessary for navigation control as well as a local brand icon display program for the present invention, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a wireless transceiver 149 for wireless communication to retrieve data from a remote server, a buffer memory 148 for temporally storing data such as state names and city names classified in the alphabetical order, etc., for retrieving and displaying them in the state selection box 61 and city selection box 63 as noted above.

The CPU 139 controls an overall operation of the navigation system including the city search under the present invention for efficiently searching a desired city on the map on the navigation screen. The data related to the state name and city name will be stored in the buffer memory 148 for further processing. As noted above, the navigation system conducts the process of displaying the state selection box, city selection box, searching candidate cities in the order of distance from the reference location, and changing the cursor to next candidate city every time when the direction key is activated by the user.

A program that performs the procedure of the present invention including the one shown in the flow charts of FIGS. 5 and 6 may be stored in the ROM 140 or other storage medium and is executed by the CPU 139. As noted above, the buffer memory 148 may be used for storing the data related to the state name and city name will for quickly retrieve such data during the city search operation. Thus, the user is able to find the city by its relative location to the current vehicle position or other reference location, thereby enabling to quickly search the target city.

As has been described above, according to the present invention, the display method and apparatus efficiently and intuitively displays the locations of the city surrounding the current vehicle position or any position specified by the user. On the screen of the navigation system, the present invention displays a specially designed screen to implement the city search operation. The display screen includes a state selection box and a city selection box, which are used to find a desired city under the present invention. The navigation system detects the direction specified by the user and moves the cursor to the location of the candidate city in response to every operation of the input device in the order of distance in the specified direction. Thus, the user is able to find the city by its relative location to the current vehicle position or other reference location, thereby enabling to quickly and intuitively search the target city.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for searching a city for a navigation system, comprising the following steps of:
    displaying a map image on a screen of the navigation system;
    specifying a state name for searching a city within the specified state;
    specifying at least a first character of a desired city name within the specified state;
    determining a reference location which is either a current user position or a location of a first city derived from input by the user;
    detecting a search direction on the map image specified by the user through an input device; and
    moving a cursor on the map image to a location of a candidate city in the specified search direction in an order of distance from the reference location in response to each operation of the input device.

2. A display method for searching a city as defined in claim 1, wherein said step of specifying a state name includes a step of displaying a state selection box on a screen of the navigation system and a step of selecting a state name in the state selection box by the user.

3. A display method for searching a city as defined in claim 2, wherein said step of selecting a state name in the state selection box by the user includes a step of operating a first set of keys for selecting a first letter of candidate state names, and a step of operating a second set of keys for selecting the candidate state names that commonly have the selected first letter.

4. A display method for searching a city as defined in claim 1, wherein said step of specifying a city name includes a step of displaying a city selection box on a screen of the navigation system and a step of selecting a city name in the city selection box by the user.

5. A display method for searching a city as defined in claim 4, wherein said step of selecting a city name in the city selection box by the user includes a step of operating a first set of keys for selecting a first letter of candidate city names, and a step of operating a second set of keys for selecting the candidate city names that commonly have the selected first letter.

6. A display method for searching a city as defined in claim 1, wherein said step of specifying a city name includes a step of displaying a city selection box on a screen of the navigation system and a step of selecting "any" in the city selection box by the user, thereby searching any city within the selected state.

7. A display method for searching a city as defined in claim 1, wherein said step of specifying a state name includes a step of displaying a state selection box on a screen of the navigation system, a step of examining a current position of the user, and a step of automatically determining the state where the current user position exists as the specified state in the state selection box unless other state is specifically selected by the user.

8. A display method for searching a city as defined in claim 1, wherein said step of determining a reference location includes a step of selecting the current user position as the reference location when the current user position exists within the selected state, and a step of selecting the location of the city selected by the user as the reference location when the current user position is outside of the selected state.

9. A display method for searching a city as defined in claim 1, wherein said step of determining a reference location includes a step of selecting the current user position as the reference location when the current user position exists within the selected state, and a step of selecting the location of the first city selected by the user as the reference location when the current user position is outside of the selected state or the current user position is too far away from a search area that includes the first city selected by the user even when the current user position exists within the selected state.

10. A display method for searching a city as defined in claim 1, wherein said step of moving a cursor to a location of a candidate city includes a step of moving the cursor to a next candidate city every time when a direction key of the input device is activated.

11. A display apparatus for searching a city for a navigation system, comprising:
means for displaying a map image on a screen of the navigation system;
means for specifying a state name for searching a city within the specified state;
means for specifying at least a first character of a desired city name within the specified state;
means for determining a reference location which is either a current user position or a location of a first city derived from input by the user;
means for detecting a search direction on the map image specified by the user through an input device; and
means for moving a cursor on the map image to a location of a candidate city in the specified search direction in an order of distance from the reference location in response to each operation of the input device.

12. A display apparatus for searching a city as defined in claim 11, wherein said means for specifying a state name includes means for displaying a state selection box on a screen of the navigation system and a step of selecting a state name in the state selection box by the user.

13. A display apparatus for searching a city as defined in claim 12, wherein said means for selecting a state name in the state selection box by the user includes means for operating a first set of keys for selecting a first letter of candidate state names, and means for operating a second set of keys for selecting the candidate state names that commonly have the selected first letter.

14. A display apparatus for searching a city as defined in claim 11, wherein said means for specifying a city name includes means for displaying a city selection box on a screen of the navigation system and means for selecting a city name in the city selection box by the user.

15. A display apparatus for searching a city as defined in claim 14, wherein said means for selecting a city name in the city selection box by the user includes means for operating a first set of keys for selecting a first letter of candidate city names, and means for operating a second set of keys for selecting the candidate city names that commonly have the selected first letter.

16. A display apparatus for searching a city as defined in claim 11, wherein said means for specifying a city name includes a step of displaying a city selection box on a screen of the navigation system and means for selecting "any" in the city selection box by the user, thereby searching any city within the selected state.

17. A display apparatus for searching a city as defined in claim 11, wherein said means for specifying a state name includes a step of displaying a state selection box on a screen of the navigation system, means for examining a current position of the user, and means for automatically determining the state where the current user position exists as the specified state in the state selection box unless other state is specifically selected by the user.

18. A display apparatus for searching a city as defined in claim 11, wherein said means for determining a reference location includes means for selecting the current user position as the reference location when the current user position exists within the selected state, and means for selecting the location of the city selected by the user as the reference location when the current user position is outside of the selected state.

19. A display apparatus for searching a city as defined in claim 11, wherein said means for determining a reference location includes means for selecting the current user position as the reference location when the current user position exists within the selected state, and means for selecting the location of the first city selected by the user as the reference location when the current user position is outside of the selected state or the current user position is too far away from a search area that includes the first city selected by the user even when the current user position exists within the selected state.

20. A display apparatus for searching a city as defined in claim 11, wherein said means for moving a cursor to a location of a candidate city includes means for moving the cursor to a next candidate city every time when a direction key of the input device is activated.

* * * * *